UNITED STATES PATENT OFFICE.

PAUL W. TURNEY, OF WASHINGTON, DISTRICT OF COLUMBIA, ASSIGNOR, BY MESNE ASSIGNMENTS, TO ZELMA E. TURNEY, SURVIVING JOINT TENANT, OF WASHINGTON, DISTRICT OF COLUMBIA.

PROCESS OF PRODUCING ICE-CREAM MIX.

1,424,602.  Specification of Letters Patent.  Patented Aug. 1, 1922.

No Drawing. Application filed February 8, 1921, Serial No. 443,414. Renewed February 6, 1922. Serial No. 534,641.

*To all whom it may concern:*

Be it known that I, PAUL W. TURNEY, a citizen of the United States of America, residing at Washington, District of Columbia, have invented certain new and useful Improvements in Processes of Producing Ice-Cream Mix, of which the following is a specification.

This invention relates to a process for the production of an ice cream mix, in which the usual artificial filler or binder is entirely dispensed with, and the body or consistency of the mix produced through the treatment of a particular constituent of the material treated.

Casein, one of the chief albuminoids of milk, is known as insoluble in its natural condition, and held in a very finely divided state in suspension in the milk. This albuminoid is of a slightly gelatinous nature, perfectly tasteless, and of a pure white color, and it is largely with the treatment and development of this particular albuminoid casein, that the present process is concerned.

A characteristic or basic feature of the present process resides in the conversion, so to speak of the casein, first a material increase in size, or swelling of the casein particles held in suspension with the effect of substantially forming a coagulated mass; second, the mechanical separation of the casein particles which by their swelling, and becoming properly developed during this change in condition, have formed into groups or masses; third, a change in the condition of a portion of each of the casein particles to form in effect a gelatinous envelope for each casein particle, and fourth, to destroy more or less permanently the tendency of the casein particles to form into mass like bodies incident to their peculiar attraction one for another, following the steps of the process.

With specific relation to the manufacture of a commercial ice cream mix, the process may be said to consist in removing the cream from the milk leaving a so-called skim milk composed chiefly of water, casein, albumin, milk sugar and salts. The skim milk is now reduced to one-third or one-fourth of its volume by evaporating the water therefrom. The casein, which as before stated, is held in suspension in the milk, is now subjected to the action of a coagulating agent, and more particularly rennet and pepsin enzymes. Following the addition of the coagulating agent to the milk body, the casein particles are subjected to a continual influence particularly in a change in appearance, that is, they are materially increased in size. It is presumed, as a result of experiments conducted along this particular line, that following the addition of the coagulates, there is a yielding up or change of the calcium in each casein particle, brought about by the usual development of lactic acid from the milk sugar, together with the rennet introduced. The calcium contained in the casein particles is being dissolved into soluble calcium by combining with the rennet and lactic acid, and after a definite period, say twenty minutes or more, enough soluble calcium salts have been produced to result in that peculiar effect upon the minute casein particles tending to increase their size.

Following the increase in size of the casein particles, there seems to have been developed by the chemical or physical change, an attractive property in each casein particle for the other particles within the limit of that attraction. This gradually results in the collection of the free casein particles into small cell like masses and a substantial clearing, so to speak, of the fluid between these cells. This particular property developed in the casein particles causes such particles in the particular cell like formations to adhere with increasing force one to another, so that the interior of the cell becomes larger, thus forming a structure simulating a honeycomb, the comb defining the casein particles and the honey defining the whey. Thus the coagulation, which as a result of the initial swelling of the casein particles, is a comparatively soft flocculent mass, will, following the attracting action just described, be so strengthened as to be appreciably different from the soft coagulate first noted. The cellular like coagulate is then broken up mechanically by agitation, so as to separate the casein particles as completely as possible one from the other. The mass then is in an evenly distributed coagulated state made up largely of the swelled particles of casein, and it is highly desirable that this condition be substantially maintained. The next and particularly important step in the process is the introduction of a portion of the sugar used ordinarily to sweeten the mix, and the addition also of a small amount of alkali, say approximately one-fourth ounce of calcium oxide and one-half ounce of baking soda, to each gallon of the mass. The sugar immediately dissolves in the water, lending more body to the water and thus to some extent interfering with the attractive characteristic of the casein particles one with another, that is, increasing the difficulty of such particles moving toward each other under such attraction. The weak alkali solution immediately begins to dissolve into a gelatinous form the outside of each casein particle. This semi-dissolving or digesting produces numerous gelatine like threads extending within all directions from each casein particle, the threads of one particle gradually massing up with the threads of another. Under this gelatinous conversion of the outer surface or portion of the casein particles, the power of attraction of one casein particle for another has been materially lessened, though each particle retains substantially its previously developed or swelled body with its innermost part, which is presumably of the original condition still capable of the attractive power. It is to be here noted that the part of the casein particle which has been partially dissolved or rendered gelatinous by the introduction of the alkali referred to, is also somewhat affected in the same manner by the pepsin in the rennet coagulate, so that this portion of the casein particles may be said to be pre-digested. The use of the sugar and alkali at this particular point in the process is important, as it tends to convert the casein particles into a more or less gelatinous condition and at the same time tend to keep such particles evenly distributed in the mass by rendering more difficult the movement of the particles due to the alleged attractiveness of one particle for another.

This delicate use of alkali and sugar, however, will not competely destroy the attractiveness of the particles referred to, and the general condition of the mass might change if the casein particles were left in this condition. Therefore another step in the process consists in totally destroying the attractive power of the particles of casein one from another, in order that such particles in their then highly developed condition may continue to remain under varying conditions and degrees of temperature to produce an evenly distributed semi-gelatinous mass. In providing for this result, cream in necessary quantity is added to the mass and the whole thoroughly agitated. The developed casein particles are now separated from each other a greater distance than before adding the cream, and the butter fat in the cream interposes an additional obstruction in the tendency of the casein particles to adhere. Practically simultaneous with the addition of the cream and the agitation of the mass, the whole is subjected to a temperature of approximately 140° for substantially fifteen minutes. The attractive power of the casein particles is entirely destroyed by the heat, and they remain substantially separated in a highly swelled gelatinous condition in the mass which is necessary to produce the required heavy body of the mix, and this without the use of any artificial binder or filler as heretofore proposed.

Briefly repeated, the characteristic and essential steps of the process are as follows:—

Separating the milk and cream and evaporating the milk, subjecting the casein particles to a coagulate; adding sugar and alkali to the mass to convert the outer portion of each casein particle into a gelatinous condition and increase the difficulty of adherence between the particles due to their attraction one for the other; adding the cream to the mass under agitation while heating the mass to an appropriate temperature to wholly destroy the attractive characteristic of the casein particles one from another.

The initial coagulate herein referred to has been indicated as pepsin or rennet enzymes. It may be said however, that the well known acid coagulates will, to a certain extent, produce the result desired, but these acid coagulates generally lack the predigested condition produced by the pepsin enzymes, and hence while for the mere purpose of the coagulation and the effect upon the casein particles herein described, other than that peculiarly incident to the pepsin or to the rennin in the rennet, the acid is to be understood as the equivalent of the pepsin or rennet, yet nevertheless such pepsin or rennet is to be preferred.

The process in the preferred steps has been described as initially evaporating the milk. The other steps of the process, however, are equally effective where the whey is originally removed from the milk by any well understood method, to reduce the fluidity of such milk. In the use of the particular step, it is preferred that as a final or semi-final step, a sufficient quantity of whey, either of that removed or such as may have been otherwise produced, is returned to the mass to reduce the same to the desired consistency.

Claims:

1. The herein described process of producing an ice cream mix, consisting in swelling the casein particles in the milk and inducing a mutual attraction therein, and partly semi-dissolving the swelled particles through the introduction of sugar and an alkali agent.

2. The herein described process of producing an ice cream mix, consisting in reducing the fluidity of the milk, introducing a coagulating agent to swell the casein particles and induce a mutual attraction thereof to form a cellular mass, mechanically breaking up the cellular formation, semi-dissolving the casein particles and partially destroying their mutual attraction through the use of sugar and an alkali, and finally destroying the mutual attraction of the casein particles by the use of heat.

3. The herein described process of producing an ice cream mix, consisting in subjecting the casein particles of the milk to the action of a coagulating agent to swell such particles, producing a gelatinous condition of a portion of each particle through the use of an alkali, rendering the particles partially and relatively inert during such conversion to a gelatinous condition, and then rendering the particles completely inert relatively.

4. The herein described process of producing an ice cream mix, consisting in subjecting the casein particles of the milk to the action of a coagulating agent to swell such particles, and to cause said particles to form a cellular structure, mechanically breaking up such cellular structure, and then converting the particles into a partial gelatinous condition and rendering them partially inert relatively through the use of sugar and an alkali.

5. The herein described process of producing an ice cream mix, consisting in separating the cream from the whole milk, evaporating a considerable portion of the water from the skim milk, subjecting the residue to a coagulating agent to swell the casein particles, agitating the mixture to evenly distribute the swelled particles, adding sugar and an alkali to the mixture, and finally subjecting the mixture to heat.

6. The herein described process of producing an ice cream mix, consisting in separating the cream from the whole milk, evaporating a considerable portion of the water from the skim milk, subjecting the residue to a coagulating agent to swell the casein particles, agitating the mixture to evenly distribute the swelled particles, adding sugar and an alkali to the mixture, adding the cream, and finally subjecting the mixture to heat.

In testimony whereof I affix my signature.

PAUL W. TURNEY.